Aug. 29, 1961 B. BERMAN 2,998,547

MAGNETIC AMPLIFIER CONTROL CIRCUITRY FOR GATED ELECTRONIC SWITCHES AND APPLICATION TO LIGHTING CONTROLS

Filed Nov. 27, 1959 3 Sheets-Sheet 1

INVENTOR.
BARUCH BERMAN
BY [signature]
ATTORNEY

INVENTOR.
BARUCH BERMAN
BY [signature]
ATTORNEY

INVENTOR.
BARUCH BERMAN
BY [signature]
ATTORNEY 2,998,547
MAGNETIC AMPLIFIER CONTROL CIRCUITRY FOR GATED ELECTRONIC SWITCHES AND APPLICATION TO LIGHTING CONTROLS Baruch Berman, River Vale, N.J., assignor to ACF Industries, Incorporated, New York, N.Y., a corporation of New Jersey Filed Nov. 27, 1959, Ser. No. 855,769
12 Claims. (Cl. 315—200)

This invention relates to the control of the firing angle of gated electronic switches or rectifiers by magnetic means and more particularly to the use of magnetic amplifier circuitry to control the intensity of incandescent lamps.

In the co-pending application, Magnetic Reset Control for Rectifier, Serial No. 812,491 now Patent No. 2,925,546 by the same inventor to the same assignee there has been disclosed the use of a self-saturating, reset control, magnetic amplifier to switch a controlled rectifier.

While the present invention employs the self-regulating magnetic feature of the co-pending application, it adds additional features allowing independent as well as self regulating control by a plurality of control signals for a variety of applications and particularly for lighting control equipment.

In the control of the intensity of incandescent lights it is desirable to obtain brightening or dimming that is continuously and linearly variable over the control range. The fact that the lamp load varies due to the impedance of the cold filament being much greater than the impedance of a hot filament imposes a severe strain on the linearity requirement as well as requiring excessive derating of components. The prior art discloses many forms of lighting control equipment commercially referred to as Light Dimmers, such as the manual controls usually variable resistance and variable auto transformers, and electronic controls providing power amplification between the control means and the lamp load, consisting generally of the motor-positioned auto transformer, the saturable reactor, the thyratron dimmer, and the magnetic amplifier.

Magnetic amplifier controls are most satisfactory since they are relatively maintenance free, have fast response, a small amount of control power can control heavy lamp loads, and they offer the design opportunity for relative insensitivity to load variations.

It is accordingly an object of this invention to provide an improved magnetic amplifier type light dimmer which uses controlled rectifiers for a power stage.

A further object is to provide an improved power source from an alternating current supply which is self regulating over a range of supply variations and allows an independent auxiliary control of output.

It is still a further object of this invention to provide an improved light dimmer which on starting limits the current inrush to the load when the lamp filaments are cold but applies nominal voltage to the load when the filaments reach their regular operating temperature.

These and further objects of the invention will become apparent from the following detailed description which is illustrated by the drawings in which:

FIG. 4(*b*) is a plot of firing voltage across the load vs. time for the half wave circuit of FIG. 1.

Figure 1:
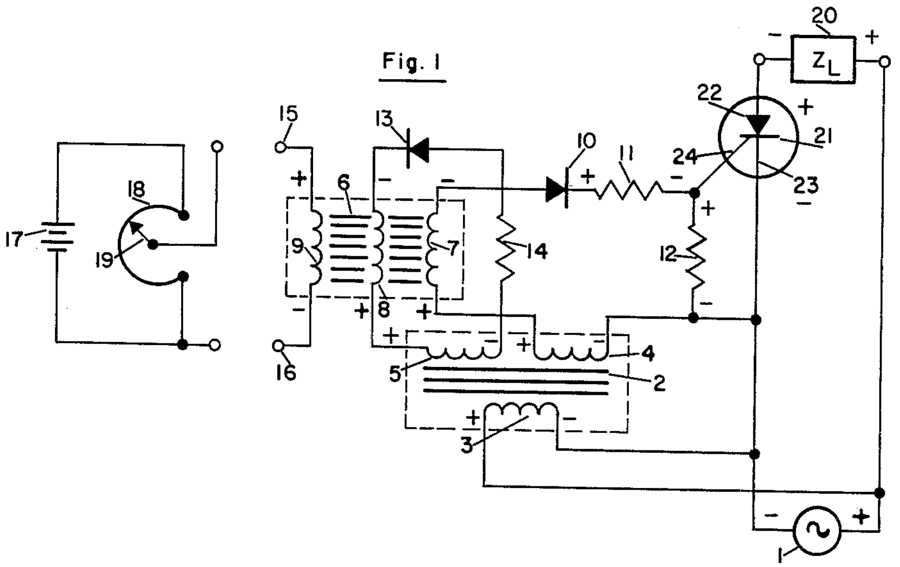
FIG. 1 is a schematic diagram showing the basic circuit of an embodiment of the invention having a half wave output and illustrating the principles involved.
Figure 2:
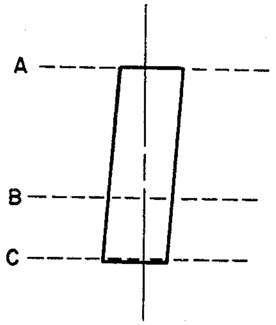
FIG. 2 represents the ideal dynamic hysteresis loop characteristic of the core material utilized in the invention.

In FIG. 1 a saturable reactor 6 is shown with a core made from a high remanence material having an ideal dynamic hysteresis loop represented by Fig. 2.

Wound around the core of reactor 6 are three windings: the first winding an output winding 7 connected in series with a secondary winding 4 of a step down isolation transformer 2, a rectifier 10 preferably of the solid state type and resistors 11 and 12; the second winding is a bias winding 8 connected in series with the remaining secondary winding 5 of transformer 2, a rectifier 13 also preferably of the solid state type and a resistor 14; the third winding is a control winding 9 connected between terminals 15 and 16. Shown as unconnected to terminals 15 and 16 are a battery 17 across which is connected a potentiometer 18 having a movable tap 19.

Power from a suitable source of alternating current 1 is applied across the primary winding 3 of transformer 2 and in series with any utilization device 20 and the anode 22 and cathode 23 of controlled rectifier 21, preferably of a commercially available silicon controlled type such as General Electric Company, type C35B, which conducts when a suitable positive voltage is applied to its gate electrode 24. Gate electrode 24 is connected to the junction of resistors 11 and 12. The junction of resistor 12 and secondary winding 4 of transformer 2 is connected to the cathode side of controlled rectifier 21.

For times of the order of a half cycle of the applied voltage to be employed with the embodiment of this invention, the magnetic circuit of the saturable reactor may be considered to be a voltage sensitive device. When the activating supply voltage is applied to the core windings of the reactor, except for a voltage drop due to a small amount of magnetizing current, all of the supply voltage is impressed across the inductance of the windings according to the relationship $$e\text{ (volts)} = -N\frac{d\phi}{dt}$$

The magnetization or flux level $\phi$ per turn, i.e. $N=1$, may therefore be expressed as $\phi = -\int e dt$. The magnetization level will therefore change in magnitude proportional to the time integral of the applied voltage and in sense by the polarity of the applied voltage.

The polarity signs shown on FIG. 1 represent the polarities existing at one instant during a half cycle of power source 1, for purposes of this explanation called a magnetizing half cycle. During the preceding or succeeding half cycle, for purposes of this explanation called a demagnetizing half cycle, the polarities are reversed. Looking at the ideal dynamic hysteresis loop FIG. 2 for the core material of saturable reactor 6, it will be assumed that the preceding demagnetizing half cycle left the residual magnetization of the core at the level C. With terminals 15 and 16 open, application of the magnetizing half cycle of the supply voltage to the windings 7 and 8 raises the magnetization level just to the saturation level A or some point below it, and except for the voltage drop due to the small magnetizing current all of the supply voltage is impressed across the inductance of the windings. Rectifier 13 prevents magnetizing current from flowing in bias winding 8 during the magnetizing half cycle. During the succeeding half cycle which is a demagnetizing half cycle, the polarities are reversed from those indicated in FIG. 1 and application of the supply voltage to the bias winding 7 of reactor 6 generates flux lines in the core material opposite to those generated during the magnetizing half cycle and reduces the magnetization of the core to the level C again. Rectifier 10 prevents demagnetizing current from flowing in output winding 7 during the demagnetizing half cycle. So long as terminals 15 and 16 remain open and the magnetization level in the reactor core remains below the saturation level A, only magnetizing current will flow in output winding 7 and controlled rectifier 21 will remain cut off.

When battery 17 and variable potentiometer 18 are connected to terminals 15 and 16 in the manner shown, direct current from battery 17 flows through control winding 9 in a direction to generate flux lines which tend to increase the magnetization level so that during the demagnetizing half cycle, the magnetization is reduced only to the level B instead of C. On succeeding magnetizing half cycles, the voltage-time integral then exceeds the amount required to saturate the core and having exceeded this amount, the effective impedance across the output winding decreases and output current flows through the output winding and through resistors 11 and 12 thereby creating a voltage across resistor 12 which in turn produces a voltage difference between gate electrodes 24 and cathode 23 of controlled rectifier 21. At the instant that this potential difference exists, the controlled rectifier conducts and current flows through utilization device 20. Resistor 11 insures a correct load line and prevents overheating and malfunction of the controlled rectifiers. It can readily be appreciated that the point in the magnetizing half cycle at which the controlled rectifier fires and therefore the portion of the corresponding source voltage 1 which the utilization device employs may be varied by the position of the tap 19 on the variable potentiometer 18 thus giving an independent means of control. It can also be appreciated that with variation in supply voltage 1, the control is self regulating, for any increase in voltage causing an increase in the magnetizing force $\int edt$ during the magnetizing cycle is offset by a corresponding increase in the demagnetizing force $-\int edt$ during the demagnetizing cycle, so the net effect remains the same. The same thing is true for a decrease in supply voltage.

As previously mentioned in connection with lighting control equipment, a major problem is the variable load due to the fact that cold lamp filaments present a much lower impedance to the control equipment than they do after they heat up. Solid state controlled rectifiers have a limit imposed on the peak sub-cycle current that they can carry and the sudden inrush of current into the load before filament impedance stabilizes has heretofore caused controlled rectifier ratings to be exceeded with corresponding deleterious results in the equipment, or caused the circuitry to be designed within the controlled rectifier ratings for cold filament operation which results in a loss of economical efficiency.

It is within the scope of this invention to provide a controlled rate of rise of control signal current to limit the inrush current into the load, until the lamp filaments have reached their stabilized temperature.

Figure 3:
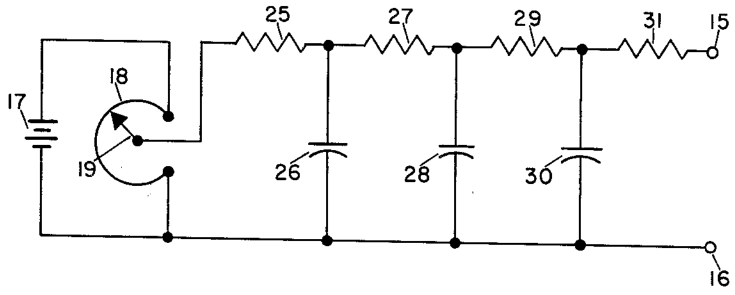
FIG. 3 is a circuit diagram of a cascaded RC delay network for controlling the rate of rise of current into the load.

FIG. 3 shows an RC delay network consisting of resistor-capacitor combinations 25 and 26, 27 and 28, and 29 and 30 connected in cascade across the parallel combination of battery 17 and variable potentiometer 18 in series with resistor 31, and across terminals 15 and 16.

Figure 4:
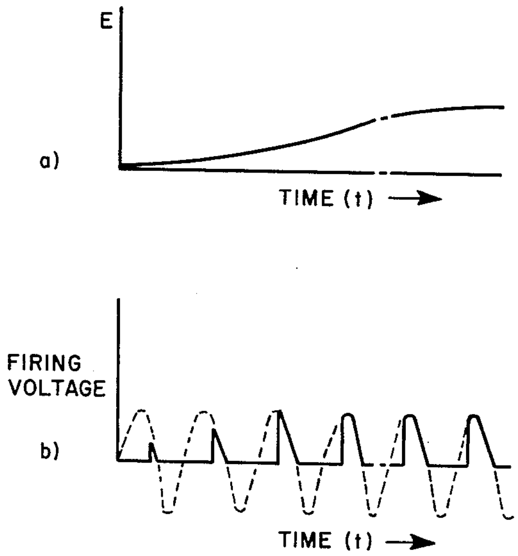
FIG. 4(*a*) is an output voltage vs time graph for the output of the delay network of FIG. 3.

FIG. 4(*a*) is an output voltage across terminals 15 and 16 vs. time graph for the delay network of FIG 3. The values of resistance and capacitance 25 through 30 are selected so that the steady state value of voltage E of FIG. 4 is not reached until such time as the lamp filaments reach their stabilized operating temperature. Until this time is reached, the voltage rise across the terminals 15 and 16 and correspondingly the M.M.F. current through control winding 9 of saturable reactor 6 is limited and this in turn delays the point in the magnetizing half cycle at which the controlled rectifier fires into the load. The desired normal operating firing point in the magnetizing half cycle after the filament comes up to temperature is determined by the setting of the movable tap 19 on the variable potentiometer 18.

FIG. 4(*b*) illustrates the way that the firing voltage across the load 20 increases corresponding to the delayed voltage buildup of FIG. 4(*a*) for one setting of movable tap 19. It should be understood that the time scale is compressed due to the space limitations of the paper. There are as many more half cycles before the voltage reaches steady state conditions as required by the application. As the setting of tap 19 is moved in a direction to decrease the voltage applied to the delay network of FIG. 3, the delayed voltage E of FIG. 4(*a*) decreases and the portion of the magnetizing half cycle of source voltage impressed on the load likewise decreases. When the setting of tap 19 is moved in a direction to increase the voltage across the network, the delayed voltage E of FIG. 4(*a*) increases and a greater portion of the magnetizing half cycle of source voltage is impressed on the load.

While for simplicity of explanation, the system has been described for half wave operation, it will be apparent to one skilled in the art that two such control circuits can be employed to obtain full wave output.

Figure 5:
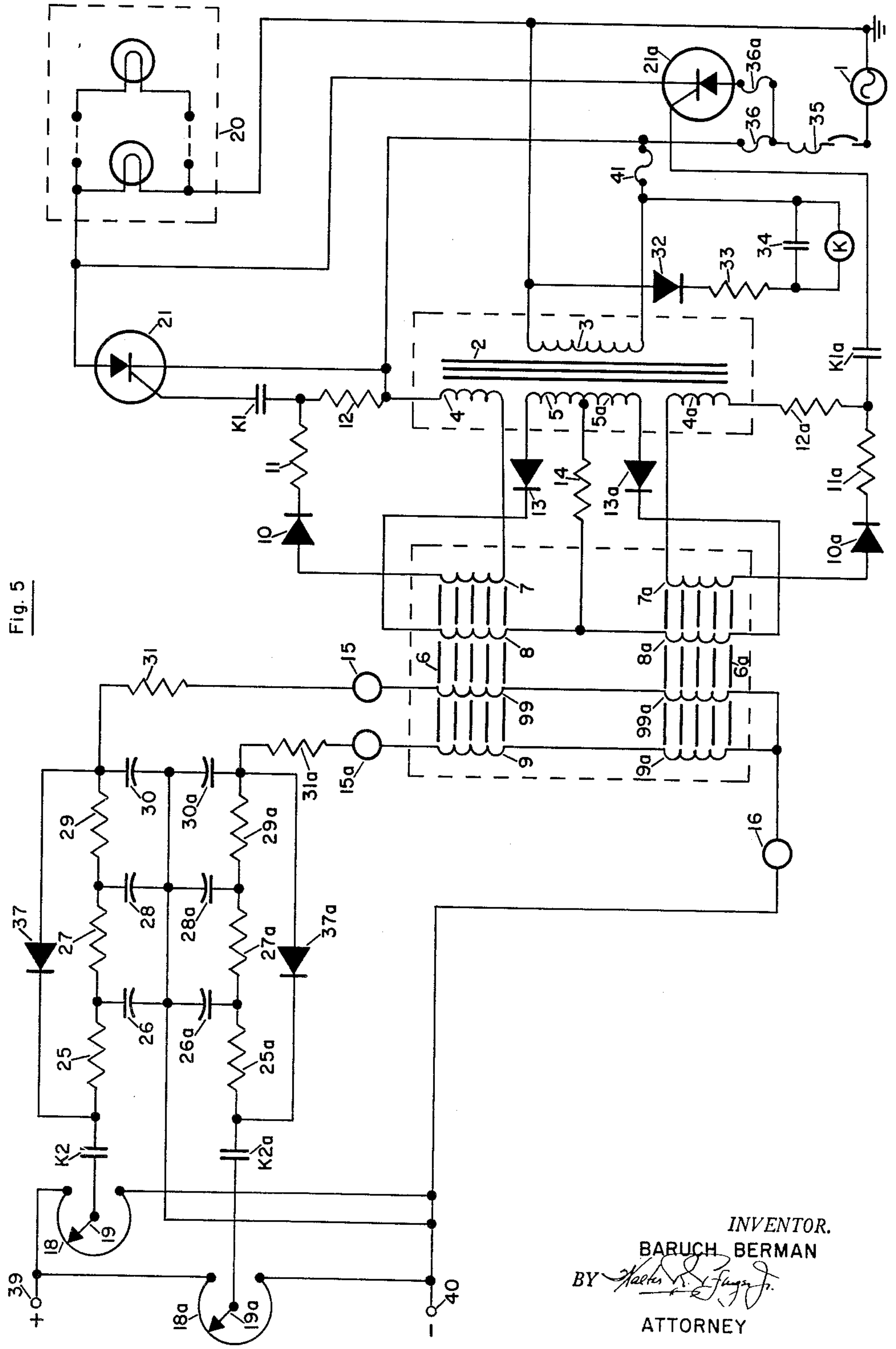
FIG. 5 is a schematic diagram showing a complete full wave control circuit for a lamp dimmer according to the present invention.

Accordingly FIG. 5 shows a full wave embodiment of this invention as applied to a light dimmer. The control circuit elements of FIG. 5 are identified by the same numerals as the corresponding elements in FIGS. 1 and 3 and function in a similar manner. However, additional features have been added to overcome specific problems associated with the application.

There are two reactor cores used in this full wave embodiment. Two independent control windings 9—9*a* and 99—99*a* are connected to the movable arms 19 and 19*a* of separate rheostats 18 and 18*a* which are connected across the terminals 39 and 40 of any suitable D.C. source. Although the current through the control windings is shown in the figure as being varied by action of two rheostats, it may be appreciated that by the employment of a suitable number of control windings any number of signals may be used to control manually or automatically the firing position of the controlled rectifiers and therefore the brightness of the lampload or the power delivered to other types of load for which this invention is applicable.

The clamping diodes 37 and 37*a* are connected across the cascaded RC delay network. They allow instant decay of control current by rapid capacitor discharge as the rheostat is adjusted for dimming but do not affect the delay when the rheostat is adjusted for increasing brightness.

As bias current flows in each reactor core only during the half cycle when the corresponding gate is not conducting and the bias windings 8 and 8*a* are separate for each core, trimming resistors (not shown) may be inserted in series with each core bias winding in place of common resistor 14 to compensate for iron, winding and controlled rectifier variations. It, therefore, overcomes the expense of using matched cores as is the usual case in existing full wave magnetic amplifier type light dimmers.

Connected across the primary winding 3 of step down transformer 2 is the series branch consisting of rectifier 32 preferably of the solid state type, resistor 33, and the parallel combination of capacitor 34 and relay coil K. When circuit breaker 35 is closed, power is applied immediately to the primary coil of the transformer 2 and each saturable reactor begins to operate as described for the half wave circuit of FIG. 1. However, resistor 33 and capacitor 34 operate as a delay network and while capacitor 34 immediately starts to charge through rectifier 32, the relay coil K does not immediately close and normally open relay contacts K1, K1*a*, K2, and K2a prevent signal current from flowing through control windings 9 and 9a and prevent the voltage developed across resistors 12 and 12a by the operation of the saturable reactors 6 and 6a respectively from being applied to the gate electrodes of controlled rectifiers 21 and 21a. Consequently when the circuit breaker is first closed and for the period of time elapsing until capacitor 34 charges and relay coil K closes, the controlled rectifiers do not fire, and no power is delivered to the bank of lamps 20. The purpose of this delay is to de-saturate each core of the reactors down to its respective level C of FIG. 2 during its respective demagnetizing cycle instead of the level B of FIG. 2 where presumably it rests due to the application of steady state M.M.F. current through control windings 9, 9a, 99 and 99a during the preceding period of operation. If this delay were not incorporated, the desired limitation of inrush current to the lampload until the filaments come up to temperature would not be obtained, for the core would be driven to saturation in the very first cycle.

Because of this delay feature fuses 36 and 36a may be selected to have an $I^2t$ rating slightly lower than that of the controlled rectifiers at steady state current instead of having to be rated for the greater value of inrush current. Fuse 41 protects primary coil 3 of transformer 2.

Resistors 12 and 12a shunt the gate of controlled rectifiers 21 and 21a respectively to bypass the magnetizing current of the cores. It has been the practice heretofore to employ delay capacitors directly across R12 and R12a with controlled rectifier applications. However, the capacitors discharge during the succeeding half cycle and cause gate current to flow when the controlled rectifier has reversed bias. This increases the leakage current at the controlled rectifier and is known to cause its destruction. Such a delay is not used here.

What is claimed is:

1. In a controlled rectifier system: a solid state rectifier having a cathode, an anode and a control electrode; a load circuit; a source of alternating voltage connected in series with said rectifier cathode to anode elements and said load; means for applying a gating signal to said control electrode of amplitude sufficient to initiate conduction and of phasing controllably variable with respect to that of said source; said gating means including a saturable magnetic core, first, second and third windings on said core, rectifying means in series with each of said first winding and said second winding, means for impressing said source of alternating voltage in series with said first and second windings and operative to drive the core toward saturation in one direction during one half cycle and in the opposite direction during the next half cycle, signal voltage means, means for applying said signal voltage means to said third winding to further drive the core toward saturation, an impedance connected in series with said second winding, and means for connecting one end of said impedance to said control electrode and the other end to said cathode.

2. Lighting control equipment comprising: a solid state rectifier having a cathode, an anode and a control electrode; a lamp load; a source of alternating voltage connected in series with said rectifier cathode to anode elements and said lamp load; means for applying a gating signal to said control electrode of amplitude sufficient to initiate conduction and of phasing controllably variable with respect to that of said source; said gating means including a saturable magnetic core, first, second and third windings on said core, rectifying means in series with each of said first winding and said second winding, means for impressing said source of alternating voltage in series with said first and second windings and operative to drive the core toward saturation in one direction during one half cycle and in the opposite direction during the next half cycle, signal voltage means, a delay means for delaying the rise of signal voltage, means for applying said delayed signal voltage to said third winding to further drive the core toward saturation, an impedance connected in series with said second winding, and means for connecting one end of said impedance to said control electrode and the other end to said cathode.

3. Lighting control equipment comprising: a solid state rectifier having a cathode, an anode and a control electrode; a switch; a lamp load; a source of alternating voltage connected by said switch in series with said rectifier cathode to anode elements and said lamp load; means for applying a gating signal to said control electrode of amplitude sufficient to initiate conduction and of phasing controllably variable with respect to that of said source, said gating means including a saturable magnetic core; first, second and third windings on said core; rectifying means in series with each of said first winding and said second winding; means for impressing said source of alternating voltage in series with said first and second windings and operative to drive the core toward saturation in one direction during one half cycle and in the opposite direction during the next half cycle; signal voltage means; first delay means for delaying the rise of signal voltage; means for applying said delayed signal voltage to said third winding to further drive the core toward saturation; second delay means; normally open closing means operative through said second delay means to prevent conduction of said solid state rectifier and application of said signal voltage to said first delay means for a minimum time delay after said switch applies source voltage to said solid state rectifier elements and said lamp load; an impedance connected in series with said second winding; and means for connecting one end of said impedance to said control electrode and the other end to said cathode.

4. A controlled rectifier system for controlling the application of an alternating voltage to a load by a signal voltage comprising: a solid state rectifier having a cathode, an anode, and a control electrode; a saturable magnetic core; first, second and third windings on said core; rectifying means in series with each of said first winding and said second winding; means for impressing said alternating voltage in series with said first and second windings and operative to drive the core toward saturation in one direction during one half cycle and in the opposite direction during the next half cycle; means for applying said signal voltage to said third winding to further drive the core toward saturation; an impedance connected in series with said second winding and having one end of said impedance connected to said control electrode and the other end to said cathode whereby a gating signal is applied to said control electrode of amplitude sufficient to initiate conduction and of phasing controllably variable with respect to that of said alternating voltage; and means for connecting said solid state rectifier to said alternating voltage and said load.

5. A controlled rectifier system for controlling the application of an alternating voltage to a load comprising: a solid state rectifier having a cathode, an anode, and a control electrode; a saturable magnetic core; first, second and third windings on said core; rectifying means in series with each of said first winding and said second winding; means for impressing said alternating voltage in series with said first and second windings and operative to drive the core toward saturation in one direction during one half cycle and in the opposite direction during the next half cycle; signal voltage means; means for applying said signal voltage to said third winding to further drive the core toward saturation; an impedance connected in series with said second winding and having one end of said impedance connected to said control electrode and the other end to said cathode whereby a gating signal is applied to said control electrode of amplitude sufficient to initiate conduction and of phasing controllably variable with respect to that of said alternating voltage; and means for connecting said solid state rectifier to said alternating voltage and said load.

6. Lighting control equipment for controlling the application of an alternating voltage to a lamp load by a signal voltage comprising: a solid state rectifier having a cathode, an anode, and a control electrode; a saturable magnetic core; first, second and third windings on said core; rectifying means in series with each of said first winding and said second winding; means for impressing said alternating voltage in series with said first and second windings and operative to drive the core toward saturation in one direction during one half cycle and in the opposite direction during the next half cycle; a delay means for delaying the rise of signal voltage; means for applying said signal voltage to said delay means; means for applying said delayed signal voltage to said third winding to further drive the core toward saturation; an impedance connected in series with said second winding and having one end of said impedance connected to said control electrode and the other end to said cathode whereby a gating signal is applied to said control electrode of amplitude sufficient to initiate conduction and of phasing controllably variable with respect to that of said alternating voltage; and means for connecting said solid state rectifier to said alternating voltage and said load.

7. Lighting control equipment for controlling the application of an alternating voltage to a lamp load by a signal voltage comprising: a solid state rectifier having a cathode, an anode, and a control electrode; a saturable magnetic core; first, second and third windings on said core; rectifying means in series with each of said first winding and said second winding; means for impressing said alternating voltage in series with said first and second windings and operative to drive the core toward saturation in one direction during one half cycle and in the opposite direction during the next half cycle; means for connecting said solid state rectifier to said alternating voltage and said lamp load; first delay means for delaying the rise of signal voltage; means for applying said signal voltage to said first delay means; means for applying said delayed signal voltage to said third winding to further drive the core toward saturation; second delay means; normally open closing means operative through said second delay means to prevent conduction of said solid state rectifier and application of signal voltage to said first delay means for a minimum time delay after connecting said alternating voltage and said lamp load to said solid state rectifier; and an impedance connected in series with said second winding and having one end of said impedance connected to said control electrode and the other end to said cathode whereby a gating signal is applied to said control electrode of amplitude sufficient to initiate conduction and of phasing controllably variable with respect to that of said alternating voltage.

8. The combination of claim 3 in which the normally open closing means comprises a relay.

9. The combination of claim 3 in which the first delay means is a series of low pass R-C filters connected in cascade.

10. Lighting control equipment according to claim 2, including means for reducing the signal voltage applied to the third winding without appreciable delay.

11. Lighting controlling equipment according to claim 10, wherein said last-mentioned means includes a diode connected in parallel with said delay means with a polarity such to produce a rapid decay of the signal voltage.

12. Lighting control equipment according to claim 11, wherein said delay means is a low pass R-C filter.

References Cited in the file of this patent

UNITED STATES PATENTS

| | | |
|---|---|---|
| 2,151,753 | Etzrodt | Mar. 28, 1939 |
| 2,157,834 | Schmidt | May 9, 1939 |
| 2,463,463 | Izenour | Mar. 1, 1949 |
| 2,466,028 | Klemperer | Apr. 5, 1949 |
| 2,809,303 | Collins | Oct. 8, 1957 |
| 2,848,614 | Lyons | Aug. 19, 1958 |